United States Patent [19]

Bossler, Jr.

[11] Patent Number: 5,233,886
[45] Date of Patent: Aug. 10, 1993

[54] INCREASED CAPACITY FACE GEAR ARRANGEMENT FOR TRANSMITTING TORQUE THROUGH AN ANGLE AND TO A PLURALITY OF POWER EXTRACTION PATHS

[75] Inventor: Robert B. Bossler, Jr., Hacienda Heights, Calif.

[73] Assignee: Lucas Western, Inc., City of Industry, Calif.

[21] Appl. No.: 888,190

[22] Filed: May 26, 1992

[51] Int. Cl.$^5$ .............................................. F16H 1/12
[52] U.S. Cl. ................................... 74/665 F; 74/411; 74/416
[58] Field of Search ............. 74/411, 416, 650, 665 H, 74/665 F, 410, 417

[56] References Cited

U.S. PATENT DOCUMENTS

| | | | |
|---|---|---|---|
| 317,628 | 5/1885 | Colman | 74/665 H |
| 1,513,387 | 10/1924 | Greve | 74/665 H |
| 2,293,279 | 8/1942 | Chilton et al. | 244/60 |
| 2,479,406 | 8/1949 | Rapuano | 74/423 |
| 2,486,671 | 11/1949 | Normann | 74/417 |
| 2,749,764 | 6/1956 | Chou | 74/352 |
| 2,865,219 | 12/1958 | Allen | 74/410 |
| 3,225,615 | 12/1965 | Little | 74/416 |
| 3,400,602 | 9/1968 | Scardaci | 74/665 F |
| 3,616,708 | 11/1971 | Davis | 74/410 |
| 3,871,248 | 3/1975 | Barish | 74/417 |
| 4,297,907 | 11/1981 | Bossler, Jr. et al. | 74/417 |
| 4,311,435 | 1/1982 | Bergero | 74/410 X |
| 4,437,355 | 3/1984 | Bordat | 74/417 |
| 4,489,625 | 12/1984 | White | 74/665 C |
| 4,741,192 | 5/1988 | Wallis | 74/417 X |
| 4,744,263 | 5/1988 | Kuiken | 74/462 |
| 4,810,916 | 3/1989 | McBride | 74/665 H X |
| 4,885,950 | 12/1989 | Smith | 74/417 X |
| 4,983,153 | 1/1991 | Luijten | 74/416 |

FOREIGN PATENT DOCUMENTS 473229 10/1937 United Kingdom ............. 74/665 H

OTHER PUBLICATIONS

Robert C. Bill, Advanced Rotorcraft Transmission Program, pp. 229, 237, presented at 46th Annual Forum of American Helicopter Society, May 21-23, 1990, Washington, D.C.

D. G. Lewicki, AVSCOM Technical Memorandum 90-C-006, pp. 4, 5, presented at Helicopter Transmission Design and Maintenance Workshop, May 21-25, 1990, Quebec City, Canada.

*Primary Examiner*—Rodney H. Bonck
*Assistant Examiner*—Ryan W. Massey
*Attorney, Agent, or Firm*—Pretty, Schroeder, Brueggemann & Clark

[57] ABSTRACT

A gear arrangement for transmitting torque through an angle and through a plurality of power extraction paths. The arrangement includes a driving shaft, a floating spur gear pinion concentrically mounted on the drive shaft, a pair of concentric and opposed face gears that are in meshing engagement with the pinion, a primary driven shaft mounted to one of the face gears and at least one non-floating spur gear also in meshing engagement with both face gears. The driving shaft is located by a bearing or a flexible coupling at the shaft end remote from the gear box to allow the pinion to float freely. Useful power may be extracted from both face gears and the non-floating spur gear as well as additional spur gears that are placed in meshing engagement with the face gears.

14 Claims, 3 Drawing Sheets

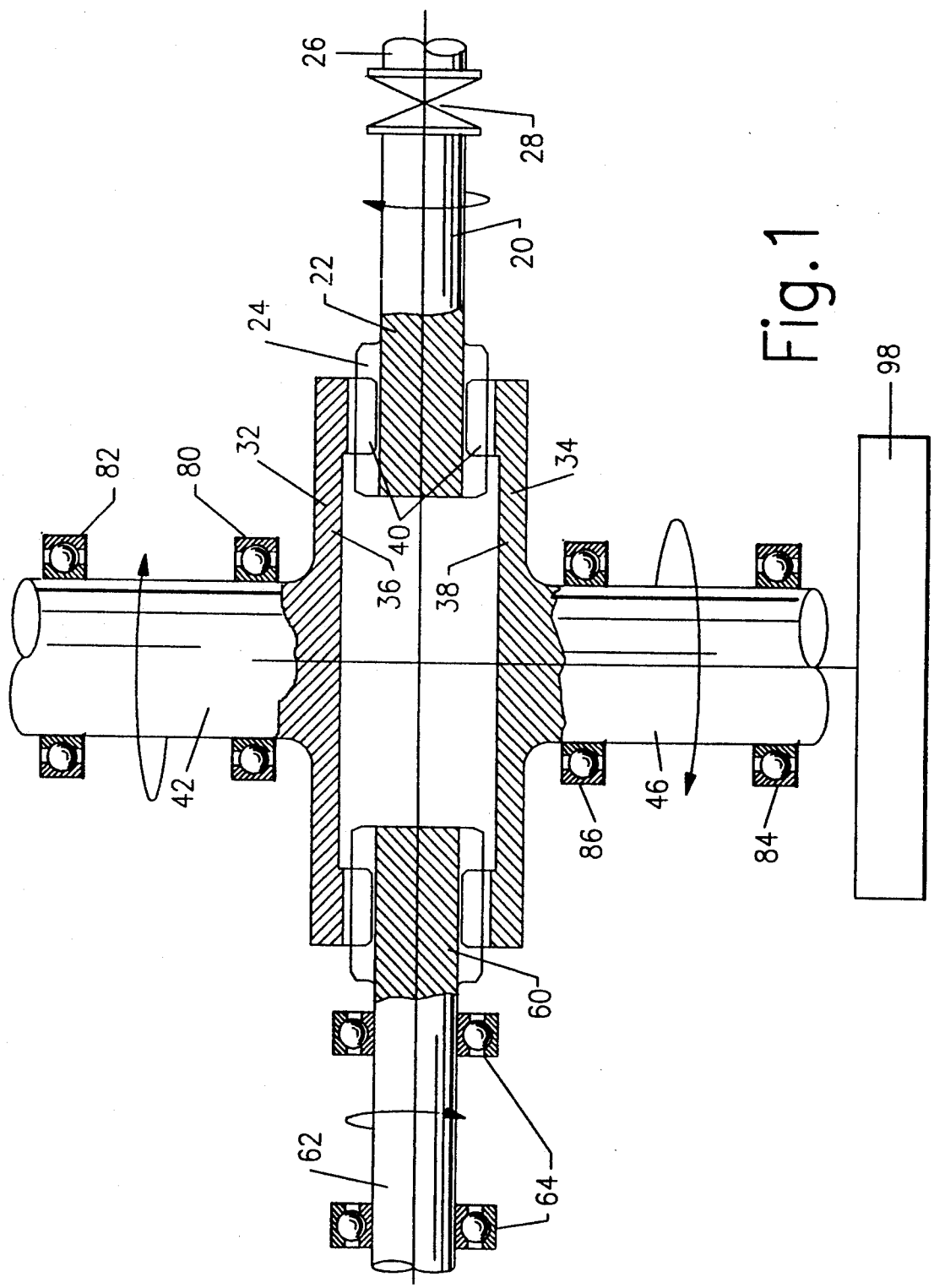

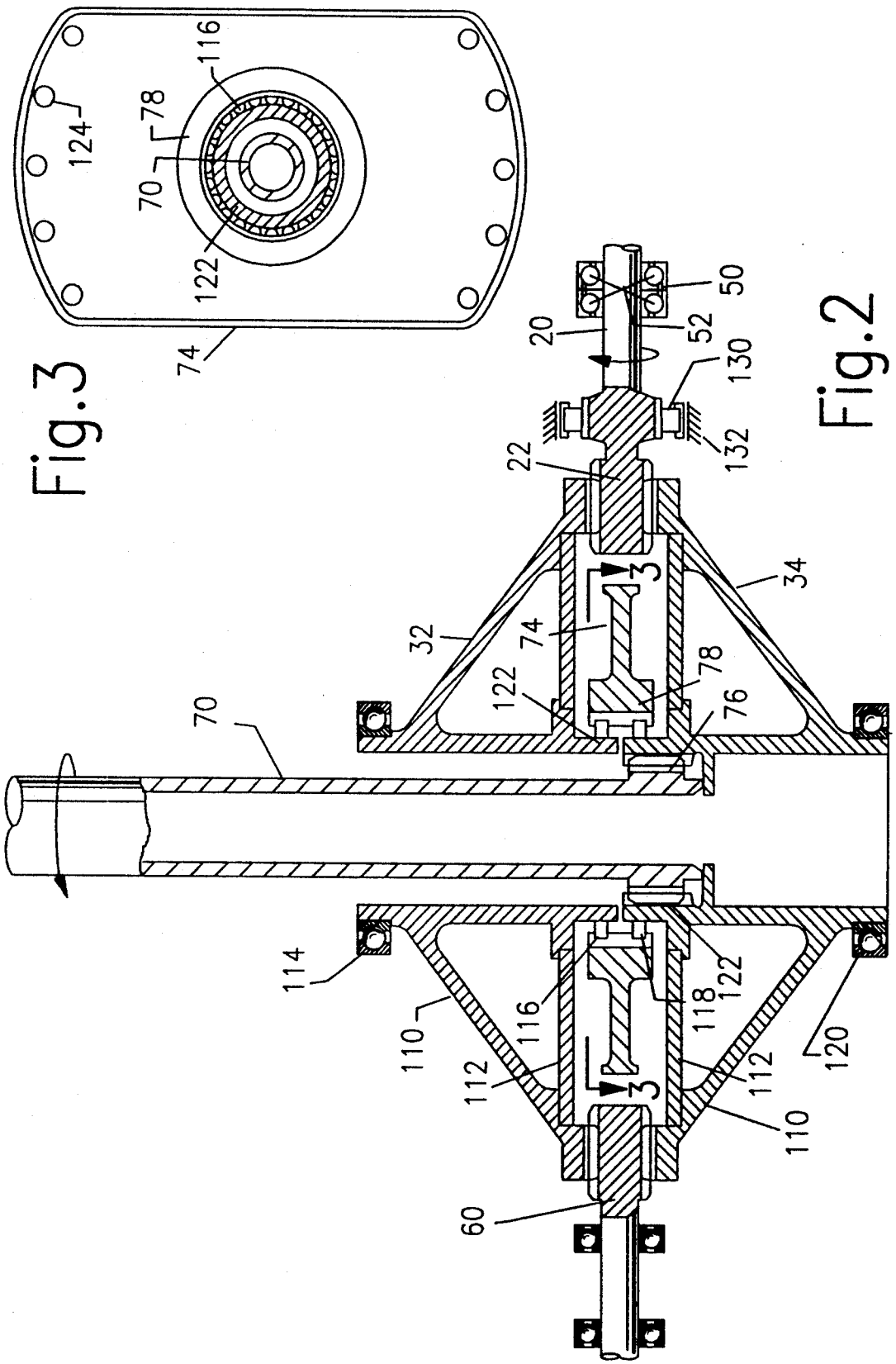

INCREASED CAPACITY FACE GEAR ARRANGEMENT FOR TRANSMITTING TORQUE THROUGH AN ANGLE AND TO A PLURALITY OF POWER EXTRACTION PATHS

This invention relates generally to a gear arrangement for transmitting torque through an angle and, in particular, to a gear arrangement that utilizes two concentric opposed face gears to transmit torque in an increased capacity to one of said face gears mounted to a driven shaft and to provide one or more additional power extraction paths between said face gears.

BACKGROUND OF THE INVENTION

A variety of gear arrangements are known for transmitting torque through an angle and, in particular, concern the transmission of power from an engine shaft to a driven shaft that is situated at a 90° angle to the engine shaft.

U.S. Pat. No. 2,865,219 issued to Alfred W. Allen discloses a power transmission system by which power to turn a shaft is applied equally to the driven member at a plurality of circumferential points equally displaced in a diametrical plane of such driven member. The gear arrangement includes a driving bevel gear mounted to a driving shaft. The driving bevel gear is in meshing engagement with both a driven bevel gear mounted to a driven shaft and a "cross-over" bevel gear that transmits power to a fourth gear on the side opposite of the driving bevel gear. The fourth gear meshes with both the driven and cross-over gears. In this manner, the patent proposes to divide the power by applying equal parts of the power to the driven gear at opposite points. The patent, however, does not describe a mechanism to ensure that equal load division will occur, e.g., manufacturing tolerance differences could result in all power going through one path and none through the other. In other words, the torque split is indeterminate. The patent further describes a through shaft that requires an additional set of bearings and structural elements because the through shaft turns in an opposing direction to the gear through which the shaft passes. The gear arrangement described also does not utilize any power extraction between the cross-over gear and the driven gear.

U.S. Pat. No. 4,437,355 issued to Andre Bordat also describes a bevel gear power transmitting arrangement having a first bevel gear coupled to a driving shaft, a second bevel gear coupled to a driven shaft whose axis is perpendicular to that of the driving shaft and meshing with the first bevel gear, a third loose bevel gear coaxial with the second one and meshing with the first one, and a fourth loose bevel gear coaxial with the first one and meshing with the second and third ones. In this manner, the patent claims to double the power transmitted by a given size bevel gear coupled to the driven axis. To achieve a proper balancing of the torque from the driving shaft bevel gear to the two gears with which it is engaged, the patent proposes mounting the driving gear so that it remains slightly floating. To do this, however, the gear arrangement described incorporates a swivel pin, bearing and thrust bearings to prevent axial movement of the driving gear. The patent further describes a through shaft that requires an additional set of bearings and structural elements. The gear arrangement described also fails to utilize any power extraction between the second and third bevel gears.

One of the problems of devices described in the above-referenced patents is that they have a relatively high number of bearing structural elements that increase the size and weight of the arrangement. Each additional element presents a possible failure mode for the system, decreasing the reliability while increasing the complexity, cost, weight and associated problems. Accordingly, it is a constant desire to improve upon prior gear arrangements by reducing the number of elements in the arrangement, yet still have a compact arrangement that will efficiently transmit torque in an optimal manner.

Additionally, in many power transmission applications, it is desired that a single driving shaft be used to power a number of auxiliary devices. For example, in a helicopter transmission, the engine is used to drive the helicopter rotor shaft as well as other devices such as the tail rotor, generators, hydraulic pumps, fuel pumps, oil pumps, etc.

It should be appreciated, therefore, that there is a need for an improved gear arrangement that transmits torque in an increased capacity from a drive shaft to a driven shaft and also that provides a plurality of additional power extraction paths for operating auxiliary devices. The present invention fulfills this need.

SUMMARY OF THE INVENTION

The present invention is embodied in a gear arrangement for transmitting torque through an angle and to a plurality of power extraction paths. The arrangement includes a driving shaft, a floating spur gear pinion concentrically mounted on the drive shaft, a pair of concentric and opposed face gears that are in meshing engagement with the pinion, a primary driven shaft mounted to one of the face gears and at least one non-floating spur gear also in meshing engagement with both face gears.

A feature of the present invention is the use of a drive shaft support that permits the spur gear pinion to float freely between the face gears so as to divide the input torque between the two face gears. The driving shaft is located by a bearing or a flexible coupling at the shaft end remote from the gear box to allow the pinion to float freely. This floating freedom does no harm because the two opposing face gears engaged by the pinion are tolerant of axial or radial motion. Because the motion is very weakly restrained, the floating spur gear pinion is forced to move to a balanced position and the torque will be divided precisely between the two driven face gears by the opposed meshing forces. The torque supplied to a first of the face gears goes directly to output. The torque supplied to the other face gear is transferred by the non-floating spur gear to the first face gear and then to output. Thus, this arrangement can double the power transmitted by a given size face gear or allow a reduction in face gear size for a given power.

Another feature of the present invention is that useful power may be extracted from both face gears and the non-floating spur gear as well as additional spur gears that are placed in meshing engagement with the face gears. The additional gears may be used to operate a generator, various pumps or other devices. This power extraction has no effect on the accuracy of the torque split.

In an additional feature of the invention, the arrangement allows the designer to provide the desired hand of rotation to the primary output shaft, either clockwise or counterclockwise, by choosing which face gear will be the preferred output.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1 is a cross-sectional view of a first preferred embodiment of the present invention.

FIG. 2 is a cross-sectional view of a second preferred embodiment of the present invention.

FIG. 3 is a cross-sectional view taken along line 3—3 of FIG. 2.

DESCRIPTION OF THE PREFERRED EMBODIMENT

Figure 4:
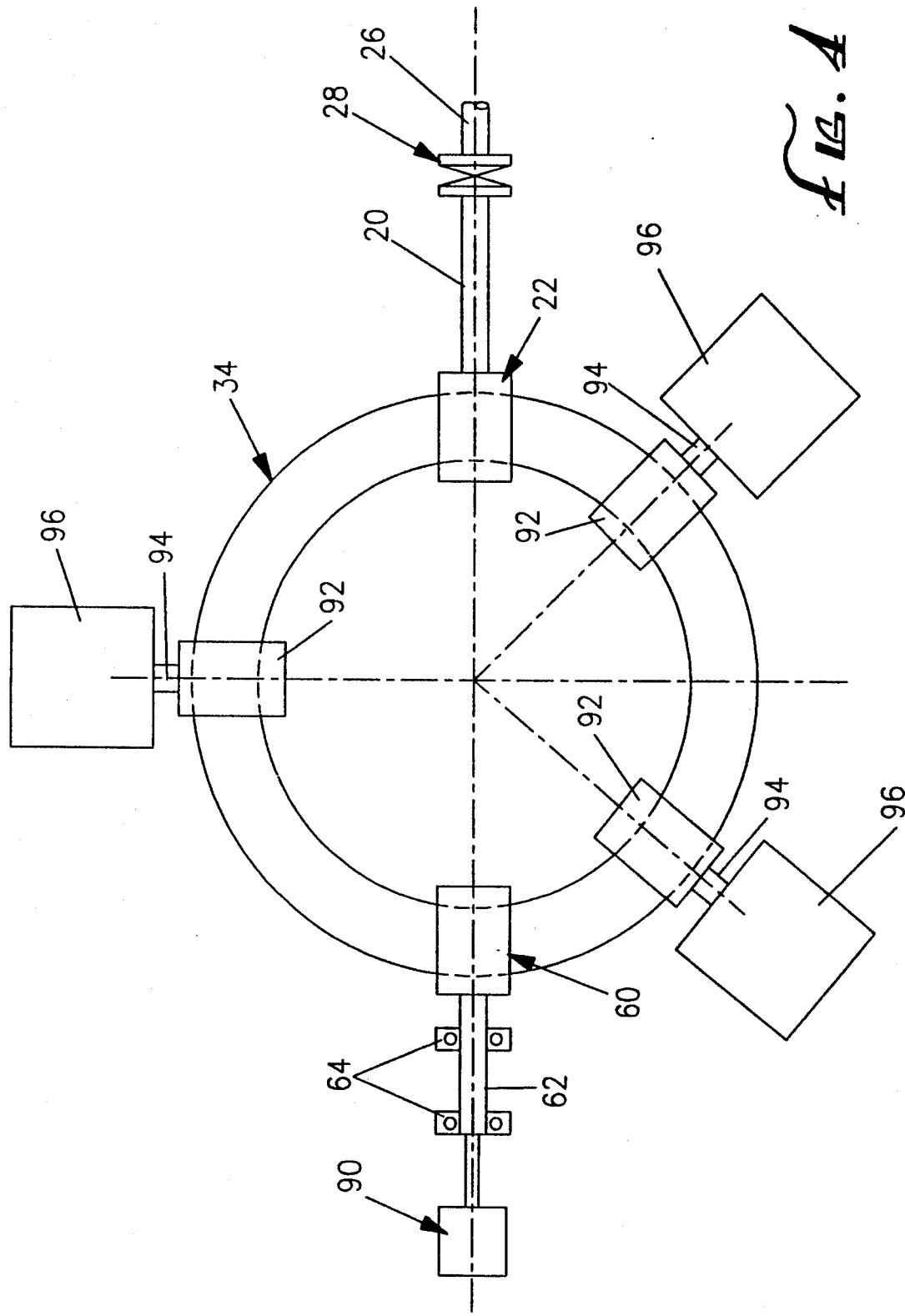
FIG 4 is a schematic plan view of the first preferred embodiment of the present invention.

A transmission, constructed in accordance with the present invention as shown in FIG. 1, has a pinion shaft 20 extending from an engine (which is not shown) and a spur gear type pinion 22 at one end of the shaft. The spur gear type pinion has radial teeth 24 on its rim, with edges parallel to the axis of rotation. The opposite end of the shaft is connected to the output shaft 26 of the engine and is supported by a flexible coupling 28.

As the pinion 22 rotates, it drives an upper face gear 32 and a lower face gear 34. The face gears are mounted concentrically and are in opposed relationship to each other. The spur gear pinion is located between the face gears and meshes with the lower surface 36 of the upper face gear and the upper surface 38 of the lower face gear. This exemplary pinion is provided with 28 teeth. The engaging surfaces of both face gears have 127 teeth 40 whose edges are radially directed along the gear periphery, toward the center of the gear, and have a pitch so as to be in smooth meshing engagement with the pinion teeth 24. The exemplary ratio of 127/28 for the face gear teeth to the pinion teeth provides a drive transfer ratio, or speed reduction, of greater than 4-to-1.

The upper face gear 32 rotates about an upper face gear shaft 42 which is rotatably supported and positioned by a lower bearing 80 and an upper bearing 82. The lower face gear 34 rotates about a lower face gear shaft 46 which is rotatably supported and positioned by a lower bearing 84 and an upper bearing 86. The shafts rotate about concentric axes. As seen in FIG. 1, for a given hand of rotation of the pinion shaft 20, the face gears and their respective shafts rotate in opposite directions. It should be apparent that the face gears rotate about an axis that is at an angle of approximately 90° from the axis of rotation of the pinion shaft. That is, a pinion gear and paired face gear combination is used to turn the corner, in the manner described in U.S. Pat. No. 5,135,442 by the present inventor, which is incorporated herein by reference.

The flexible coupling 28 permits the pinion shaft and the pinion to float, both axially and radially, so as to provide automatic and flexible balancing between the two torques transferred respectively from the pinion to the two face gears with which it is engaged. Many arrangements are known to those skilled in the art for ensuring that the pinion gear is free-floating. For example, the flexible coupling may be substituted by a duplex pair of ball bearings 50 (e.g. angular contact bearings) mounted face-to-face to provide a pivot point 52 (see FIG. 2). In other words, the lines of action of the two bearings face toward each other so that they coincide at the axis of rotation of the pinion shaft to provide a pivot point. Alternatively, a crowned splined coupling or universal joint may be used. By using a flexible coupling, a ball bearing arrangement, a crowned splined coupling or other similar means, the position of the pinion gear is permitted to automatically adjust between the face gears so that the two torques transferred to the face gears are substantially identical. Furthermore, the pinion and face gears provide a spur/face gear arrangement that exhibits true conjugate action and accommodates high speed-reduction ratios. Such an arrangement is also tolerant of thermal changes and deflections under load, and increases the quietness and smoothness of operation.

A non-floating spur gear 60 is mounted between the face gears at a location 180° around the periphery of the face gears from the floating pinion 22. The non-floating spur gear is mounted at one end of a shaft 62. The other end of the shaft may be operably connected to an auxiliary device 90 (see FIG. 4) to receive power from the shaft. The non-floating spur gear and its shaft are rotatably supported and positioned by a pair of bearings 64.

The non-floating spur gear performs a dual function by first serving as a crossover gear, transferring power from one face gear to the other face gear and, second, by serving as a power extraction path for providing power to auxiliary devices such as generators and pumps. A plurality of such non-floating spur gears 92 and shafts 94 may be added along the periphery of the face gears to provide power to other auxiliary devices 96 as desired or to provide a plurality of load paths transferring power from one face gear to the other (see FIG. 4).

In the case of a helicopter transmission, wherein the shaft 20 extends from the engine and the upper face gear shaft is a helicopter rotor shaft, the gear arrangement shown in FIG. 1 can double the power transmitted by a given size face gear or allow a reduction in the size of the face gear for a given power. Because the pinion is permitted to float freely, the pinion torque will be divided precisely between the two face gears by the opposing meshing forces. The torque supplied to the upper face gear goes directly to the rotor shaft. The torque supplied to the lower face gear is transferred by the non-floating spur gear to the upper face gear and to the rotor shaft. Additionally, the floating pinion allows power to be absorbed by any or all of the other three shafts, i.e., the non-floating spur gear, the upper face gear or the lower face gear. This capability does not affect the torque split. Useful power may also be extracted from the lower face gear to operate another auxiliary device 98.

Referring to FIG. 2, a second preferred embodiment of the invention is shown wherein a helicopter rotor shaft 70 is mounted to the lower face gear thus reversing the hand of rotation of the rotor shaft from that shown in FIG. 1. Each face gear has a cone portion 110 welded to a disk portion 112 for optimum strength. The upper face gear 32 is straddle mounted and located by an upper bearing 114 and a lower bearing 116. The lower face gear 34 is straddle mounted and located by an upper bearing 118 and a lower bearing 120. The bearings 116 and 118 interposed between the face gears are mounted to a flat plate 74 having a cylindrical mount portion 78 and serve to locate cylindrical extension portions 122 extending outwardly from the disk portions of the face gears (see also FIG. 3). The flat plate is secured to the helicopter structure by bolts 124 and may include recesses (not shown) for locating additional non-floating spur gears between the face gears. The rotor shaft may be mounted to the lower face gear by a spline 76 at the top end of the bottom face gear.

An added safety feature is a non-contacting roller bearing set 130 that provides a restraint for the pinion 22 in the event of a failure of one of the face gears. The roller bearing set is separated from its outer contact surface 132 a sufficient distance to permit normal floating of the pinion.

It should be appreciated from the foregoing description that the present invention provides a gear arrangement for transmitting torque through an angle in an increased capacity and for transmitting torque to a plurality of non-floating spur gears located between the face gears. Although the invention has been described in detail with reference to the presently preferred embodiment, those of ordinary skill in the art will appreciate that various modifications can be made without departing from the invention, such as using helical gears rather than spur gears. Accordingly, the invention is defined only by the following claims.

I claim:

1. A gear arrangement for transmitting torque from an output shaft of an engine comprising:
    a pinion shaft for receiving torque from the output shaft;
    a pinion mounted concentrically to a first end of the pinion shaft;
    upper and lower concentric and opposed face gears meshingly engaged with said pinion;
    means for permitting the pinion to float such that torque from the pinion shaft is split equally between the face gears;
    a primary driven shaft coupled to one of said face gears; and
    at least one non-floating shaft having a gear in meshing engagement with said first and second face gears.

2. The gear arrangement of claim 1 further comprising an auxiliary device operatively connected to and powered by said non-floating shaft.

3. The gear arrangement of claim 2 including a plurality of said non-floating shafts operatively connected to a plurality of auxiliary devices, respectively.

4. The gear arrangement of claim 1, further comprising a secondary driven shaft coupled to the other face gear and rotating in a direction counter to that of said primary driven shaft.

5. The gear arrangement of claim 4 wherein the secondary driven shaft is operatively connected to an auxiliary device.

6. The gear arrangement of claim 1 wherein said primary driven shaft is mounted to said lower face gear and extends upwardly through said upper face gear.

7. The gear arrangement of claim 1 further comprising a means for restraining the pinion in the event of failure of one of the face gears.

8. The gear arrangement of claim 1 further comprising bearings and a plate interposed between the face gears, said bearings mounted to a cylindrical mount portion of said plate for locating a lower end of said upper face gear and an upper end of said lower face gear.

9. A gear arrangement for transmitting torque from an output shaft of an engine comprising:
    a pinion shaft for receiving torque from the output shaft;
    a pinion mounted concentrically to a first end of the pinion shaft;
    upper and lower concentric and opposed face gears meshingly engaged with said pinion;
    means for permitting the pinion to float such that torque from the pinion shaft is split equally between the face gears;
    a primary driven shaft coupled to one of said face gears;
    at least one non-floating shaft having a gear in meshing engagement with said first and second face gears; and
    an auxiliary device operatively connected to and powered by said non-floating shaft.

10. The gear arrangement of claim 9 including a plurality of auxiliary devices operatively connected to and powered by a plurality of non-floating shafts, respectively.

11. A gear arrangement for transmitting torque from an output shaft of an engine comprising:
    a pinion shaft for receiving torque from the output shaft;
    a pinion mounted concentrically to a first end of the pinion shaft;
    upper and lower concentric and opposed face gears meshingly engaged with said pinion;
    means for permitting the pinion to float such that torque from the pinion shaft is split equally between the face gears;
    a primary driven shaft coupled to one of said face gears;
    at least one non-floating shaft having a gear in meshing engagement with said first and second face gears; and
    a secondary driven shaft coupled to the other face gear and rotating in a direction counter to that of said primary driven shaft wherein the secondary driven shaft is operatively connected to an auxiliary device.

12. A gear arrangement for transmitting torque from an output shaft of an engine comprising:
    a pinion shaft for receiving torque from the output shaft;
    a pinion mounted concentrically to a first end of the pinion shaft;
    upper and lower concentric and opposed face gears meshingly engaged with said pinion;
    means for permitting the pinion to float such that torque from the pinion shaft is split equally between the face gears;
    a primary driven shaft coupled to one of said face gears;
    at least one non-floating shaft having a gear in meshing engagement with said first and second face gears; and
    means for restraining the pinion in the event of failure of one of the face gears.

13. A gear arrangement for transmitting torque from an output shaft of an engine comprising:
    a pinion shaft for receiving torque from the output shaft;
    a pinion mounted concentrically to a first end of the pinion shaft;

upper and lower concentric and opposed face gears meshingly engaged with said pinion;

means for permitting the pinion to float such that torque from the pinion shaft is split equally between the face gears;

a primary driven shaft coupled to one of said face gears;

at least one non-floating shaft having a gear in meshing engagement with said first and second face gears; and bearings and a plate interposed between the face gears, said bearings mounted to a cylindrical mount portion of said plate for locating a lower end of said upper face gear and an upper end of said lower face gear.

14. A gear arrangement for transmitting torque from an output shaft of an engine comprising:

a pinion shaft having a first end and a second end, the first end receiving torque from the output shaft;

a spur gear mounted concentrically to the second end of the pinion shaft;

upper and lower concentric and opposed face gears meshingly engaged with said spur gear, the second end of the pinion shaft being otherwise unrestrained;

means for permitting the spur gear to float radially and axially such that torque from the pinion shaft is split equally between the face gears;

a primary driven shaft coupled to one of said face gears; and at least one non-floating shaft having a spur gear in meshing engagement with said first and second face gears.

* * * * *